US011953159B2

(12) United States Patent
Liang et al.

(10) Patent No.: US 11,953,159 B2
(45) Date of Patent: Apr. 9, 2024

(54) SYSTEM AND METHOD FOR CRYOGENIC VAPORIZATION WITH PARALLEL VAPORIZER ARRANGEMENTS

(71) Applicants: Chao Liang, East Amherst, NY (US); Seth A. Potratz, Grand Island, NY (US); Lee J. Rosen, Buffalo, NY (US); Hanfei Tuo, East Amherst, NY (US); Rui Ma, Spencer, MA (US)

(72) Inventors: Chao Liang, East Amherst, NY (US); Seth A. Potratz, Grand Island, NY (US); Lee J. Rosen, Buffalo, NY (US); Hanfei Tuo, East Amherst, NY (US); Rui Ma, Spencer, MA (US)

(73) Assignee: Praxair Technology, Inc., Danbury, CT (US)

( * ) Notice: Subject to any disclaimer, the term of this patent is extended or adjusted under 35 U.S.C. 154(b) by 331 days.

(21) Appl. No.: 17/517,031

(22) Filed: Nov. 2, 2021

(65) Prior Publication Data

US 2022/0290813 A1 Sep. 15, 2022

Related U.S. Application Data

(60) Provisional application No. 63/159,594, filed on Mar. 11, 2021.

(51) Int. Cl.
*F17C 7/04* (2006.01)
*F17C 13/02* (2006.01)

(52) U.S. Cl.
CPC .............. *F17C 7/04* (2013.01); *F17C 13/026* (2013.01); *F17C 2250/032* (2013.01); *F17C 2250/0439* (2013.01)

(58) Field of Classification Search
CPC .... F17C 7/04; F17C 13/026; F17C 2250/032; F17C 2250/0439; F17C 2221/033;
(Continued)

(56) References Cited

U.S. PATENT DOCUMENTS 5,390,500 A 2/1995 White et al.
6,644,041 B1 11/2003 Eyermann
(Continued)

FOREIGN PATENT DOCUMENTS

CN 205505842 U 8/2016
CN 210107040 U 2/2020
(Continued)

*Primary Examiner* — Emmanuel E Duke
(74) *Attorney, Agent, or Firm* — Robert J. Hampsch

(57) ABSTRACT

A cryogenic vaporization system and a method for controlling the system are provided. The system includes a first vaporizer arrangement and a second vaporizer arrangement configured for receiving a liquid cryogen and outputting a superheated vapor. The second vaporizer arrangement is connected in parallel with the first vaporizer arrangement, and includes one or more banks of ambient air vaporizer (AAV) units or loose fill media with a high heat capacity. The second vaporizer arrangement has a different configuration than that of the first vaporizer arrangement. The system further includes at least one control valve controlling provision of the liquid cryogen to at least one of the first vaporizer arrangement and the second vaporizer arrangement.

5 Claims, 5 Drawing Sheets

(58) Field of Classification Search
CPC ........ F17C 2223/0161; F17C 2223/033; F17C 2223/046; F17C 2225/0123; F17C 2225/035; F17C 2227/0135; F17C 2227/0332; F17C 2227/0393; F17C 2265/05; F17C 2265/068; F17C 2270/0136; F17C 9/02
See application file for complete search history.

(56) References Cited

U.S. PATENT DOCUMENTS

| | | | | |
|---|---|---|---|---|
| 8,069,677 | B2 | 12/2011 | Faka | |
| 8,662,149 | B1 | 3/2014 | Bernert, Jr. et al. | |
| 8,776,535 | B1 | 7/2014 | Bernert, Jr. et al. | |
| 2007/0271932 | A1* | 11/2007 | Dutt .......................... | F17C 9/02 62/50.2 |
| 2008/0250795 | A1* | 10/2008 | Katdare .................... | F17C 9/02 62/50.2 |
| 2009/0165468 | A1* | 7/2009 | Wiindaarden ............. | F17C 5/06 62/53.2 |
| 2010/0043453 | A1 | 2/2010 | Mak | |
| 2010/0101240 | A1 | 4/2010 | Mak | |
| 2013/0111928 | A1 | 5/2013 | Bernert, Sr. et al. | |
| 2021/0356196 | A1* | 11/2021 | Drube ....................... | F17C 9/02 |

FOREIGN PATENT DOCUMENTS

| | | | |
|---|---|---|---|
| DE | 4025138 | A1 | 2/1992 |
| EP | 3483419 | A1 | 5/2019 |
| JP | 2006029356 | A | 2/2006 |
| JP | 2010-203520 | A | 9/2010 |

* cited by examiner

SYSTEM AND METHOD FOR CRYOGENIC VAPORIZATION WITH PARALLEL VAPORIZER ARRANGEMENTS

TECHNICAL FIELD

The present disclosure relates generally to cryogenic vaporization systems, and more particularly, to a system for cryogenic vaporization having alternate vaporizer arrangements configured in parallel.

BACKGROUND

A typical cryogenic regasification system, as shown in FIG. 1, includes a liquid cryogen storage tank 102 that outputs liquid cryogen to a heat exchanger (or vaporizer) 106 via a control valve 104. The control valve 104 can be upstream or downstream of the heat exchanger 106 and controls the flow of the liquid cryogen to the heat exchanger 106. The heat exchanger 106 vaporizes the liquid cryogen into superheated vapor. The superheated vapor is supplied to an end user through a pipeline. Categorization of the heat exchanger 106 is dependent on a heating medium that is used for vaporization. For example, ambient air is used as a heating medium for an ambient air vaporizer (AAV), and water, or a fluid mixture designed to avoid freezing pending ambient conditions, is used as a heating medium for a water bath vaporizer (WBV).

If a regasification system is continuously used to supply vaporized gas to a end user, it is referred to as a continuous supply system. If a regasification system is used only when a plant is shut down, it is referred to as a back-up system. A back-up system can also be used for "peak shaving" to supply vaporized gas to a end user for a period of time when the end user's demand exceeds the capacity of the plant. A pipeline within the regasification system is typically made of stainless steel or another cryogenically appropriate material. However, a pipeline to the end user is typically made of carbon steel, which may become brittle at lower temperatures. Therefore, typical piping standards specify a minimum design temperature for carbon steel.

FIG. 2 is a diagram illustrating a WBV in a back-up system. Similar to FIG. 1, a cryogenic storage tank 202 outputs liquid cryogen to a WBV 206 via a control valve 204. The control valve 204 can be upstream or downstream of the WBV 206 and controls the flow of the liquid cryogen to the WBV 206. The WBV 206 is a shell-and-tube heat exchanger having cryogen within the tube and water within the shell surrounding the tube. External heat (e.g., natural gas fired heat, electrically heated heat, steam sparged heat, etc.) is used to heat the water, either directly or indirectly, and the heated water is used to vaporize the liquid cryogen into superheated vapor. Because the water bath is heated to a high temperature (e.g., approximately 160° F.), the formation of ice around the tubes of the WBV 206 is generally negligible. Therefore, the WBV 206 performs at a steady state. However, upon failure of a burner, the loss of natural gas, the loss of electric power, or the loss of steam, for example, the water temperature drops due to removal of the external heat. As a result, the overall heat transfer coefficient decreases due to a smaller temperature difference between the water and the cryogen, and the formation of ice around the tubes of the WBV 206 increases. The heat transfer rate also degrades, which results in a drop in temperature of the superheated vapor that exits the WBV 206. If the temperature drops below a safe margin for a carbon steel pipeline, the end user could be at risk.

In an effort to overcome the above-described problems, the tube bundle size of the WBV is commonly overdesigned to provide a larger heat transfer area, and the shell size of the WBV is overdesigned to provide a greater thermal mass of water, which is referred to as thermal ballast. This overdesign guarantees WBV performance for a certain period of time (i.e., ballast time), such as, for example, from 15 minutes to 1 hour, in the event of a loss of external heat. When a WBV is used in a back-up system for a medium-sized air separation plant, the WBV may require approximately 40,000 gallons of water storage in order to achieve a thermal ballast time of 30 minutes.

Alternatively, in another effort to overcome the above-described problems, a non-condensable and inert gas bubble agitation system and gas sparging manifold may be used in the WBV to improve natural convection heat transfer of the water during the ballast time. While this may reduce the required water volume and shell size of the WBV, it also adds design complexity to the WBV. For example, an external gas supply would be required for the agitation system, the sparging manifold would be required to control bubble size and spacing, and bubble containment baffles would be required to control bubble velocity. Therefore, these added complexities may not justify any savings that are achieved by the reduced tube bundle size and water volume, and hence a shell size of the WBV.

Accordingly, the ballast time requirement for the WBV generally results in an overdesigned tube bundle size and shell size, which presents challenges and increased costs for fabrication, shipping, and field erection.

FIG. 3 is a diagram illustrating an AAV in a regasification system. A cryogenic storage tank 302 outputs liquid cryogen to a first bank of AAV units 308 via a first control valve 304 on a first line and to a second bank of AAV units 310 via a second control valve 306 on a second line. The first control valve 304 and the second control valve 306 can be upstream or downstream of the first bank of AAV units 308 and the second bank of AAV units 310, respectively, and control the flow of the liquid cryogen to either the first bank of AAV units 308 on the first line or the second bank of AAV units 310 on the second line. The first and second lines are connected in parallel and rejoin after the first and second banks of AAV units 308, 310 to provide superheated vapor to an end user. Each AAV unit includes multiple finned aluminum tube extrusions. The liquid cryogen passes through a number of interconnected tubes in various series and parallel paths absorbing heat from ambient air outside of the tubes, thereby vaporizing the liquid cryogen and generating the superheated vapor.

An AAV unit may be categorized as a natural draft AAV unit or a forced draft AAV unit. A natural draft AAV unit has no movable parts and uses the natural convection of ambient air to vaporize the liquid cryogen, which results in zero operational expenditures and zero maintenance cost. A forced draft AAV unit has a fan above the unit, and induces forced convection of ambient air to vaporize the liquid cryogen, which increases vaporization capacity. However, the introduction of this rotating equipment results in increased operational expenditures and maintenance cost.

During operation of an AAV unit, frost may form on the surface of the finned tubes resulting in capacity degradation over time. In order to defrost and restore vaporizer capacity, systems are often configured to have two banks of AAV units, which operate alternately (e.g., the first bank of AAV units 308 and the second bank of AAV units 310). While a first bank of AAV units is operating, a second bank of AAV units is off or idle in order to defrost.

Another heat exchanger, commonly referred to as a trim heater 312, may optionally be disposed downstream of the first and second AAV banks 308, 310 to further superheat the output vaporized gas. For example, in cold weather conditions, if the AAVs are unable to superheat vaporized gas to a desired temperature, the trim heater 312 may be utilized to superheat the gas. The trim heater 312 is externally powered by, for example, electricity or natural gas.

Depending on ambient conditions and geographic locations, an idle bank of AAV units may not be able to fully defrost before returning to operation as the duty bank of AAV units. Hence, the vaporization capacity of the bank of AAV units may not be fully restored, impacting the performance of the bank of AAV units as the duty bank of AAV units in the next cycle. Alternatively, the idle bank of AAV units may be fully defrosted long before returning to operation as the duty bank of AAV units.

For example, in a cold and/or dry ambient condition, the idle bank of AAV units may not be able to fully defrost before returning to operation. This may result in an endless loop in which the capacity of both banks of AAV units degrade over time and are never fully restored. Simply increasing the cycle time may not solve this problem because more frost is required to be defrosted with a longer defrosting time. Additionally, the frost may convert from rime to ice and/or ice may form bridging or blocking fins, and deicing takes more time than defrosting. Simply increasing the cycle time is also not economic, because a longer cycle time requires a greater heat transfer area, and hence, more AAV units to achieve the same vaporization capacity.

As another example, in a warm and/or humid ambient condition, the idle bank of AAV units may be fully defrosted long before returning to operation, which leaves available restored capacity unused for a long period of time. Simply decreasing cycle time may not solve the problem because less frost needs to be defrosted with a shorter defrosting time, which again may result in a fully defrosted idle bank of AAV units long before they return to operation.

To overcome the above-described problems, proposals that enhance the defrosting of an idle bank of AAV units are often made at the cost of introducing additional equipment and complexity, and hence, capital cost, which negates the benefits of systems that utilizes AAV units.

SUMMARY

According to an embodiment, a cryogenic vaporization system is provided. The system includes a first vaporizer arrangement configured for receiving a liquid cryogen and outputting a superheated vapor. The first vaporizer arrangement includes a WBV. The system also includes a second vaporizer arrangement configured for receiving the liquid cryogen and outputting the superheated vapor. The second vaporizer arrangement is connected in parallel with the first vaporizer arrangement and includes a passive heating medium. The system further includes at least one control valve controlling provision of the liquid cryogen to the first vaporizer arrangement or the second vaporizer arrangement.

According to an embodiment, a cryogenic vaporization system is provided. The system includes a first vaporizer arrangement configured for receiving a liquid cryogen and outputting a superheated vapor. The first vaporizer arrangement includes a first bank of AAV units. The system also includes a second vaporizer arrangement configured for receiving the liquid cryogen and outputting the superheated vapor. The second vaporizer arrangement is connected in parallel with the first vaporizer arrangement and includes a second bank of AAV units and a third bank of AAV units connected in parallel. The system further includes at least one control valve controlling provision of the liquid cryogen to at least one of the first vaporizer arrangement and the second vaporizer arrangement.

According to an embodiment, a cryogenic vaporization system is provided. The system includes a first vaporizer arrangement configured for receiving a liquid cryogen and outputting a superheated vapor. The system also includes a second vaporizer arrangement configured for receiving the liquid cryogen and outputting the superheated vapor. The second vaporizer arrangement is connected in parallel with the first vaporizer arrangement, and includes one or more banks of AAV units. The second vaporizer arrangement has a different configuration than that of the first vaporizer arrangement. The system further includes at least one control valve controlling provision of the liquid cryogen to at least one of the first vaporizer arrangement and the second vaporizer arrangement.

According to an embodiment, a method is provided for controlling a cryogenic vaporization system. A liquid cryogen is received, via at least one control valve, at one of a first vaporizer arrangement and a second vaporizer arrangement, which are connected in parallel. The first vaporizer arrangement includes a WBV, and the second vaporizer arrangement includes a passive heating medium. The superheated vapor is output from the one of the first vaporizer arrangement and the second vaporizer arrangement.

According to an embodiment, a method is provided for controlling a cryogenic vaporization system. A liquid cryogen is received, via at least one control valve, at at least one of a first vaporizer arrangement and second vaporizer arrangement, which are connected in parallel. The first vaporizer arrangement includes a first bank of AAV units. The second vaporizer arrangement includes a second bank of AAV units and a third bank of AAV units connected in parallel. A superheated vapor is output from the at least one of the first vaporizer arrangement and the second vaporizer arrangement.

According to one embodiment, a method is provided for controlling a cryogenic vaporization system. A liquid cryogen is received, via at least one control valve, at at least one of a first vaporizer arrangement and a second vaporizer arrangement, which are connected in parallel. The second vaporizer arrangement includes one or more banks of AAV units. The second vaporizer arrangement has a different configuration than that of the first vaporizer arrangement. A superheated vapor is output from the at least one of the first vaporizer arrangement and the second vaporizer arrangement.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
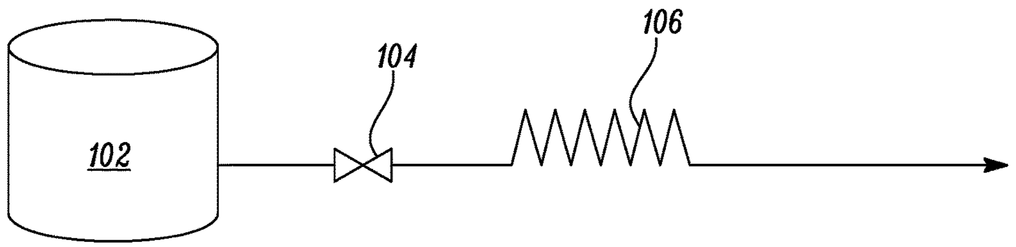
FIG. 1 is a diagram illustrating typical cryogenic regasification system.
Figure 2:
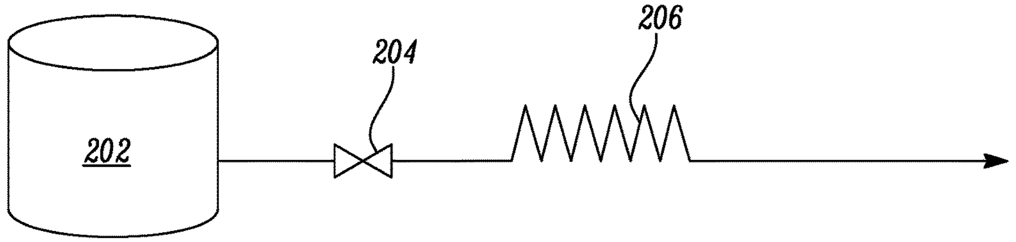
FIG. 2 is a diagram illustrating a WBV in a back-up regasification system.
Figure 3:
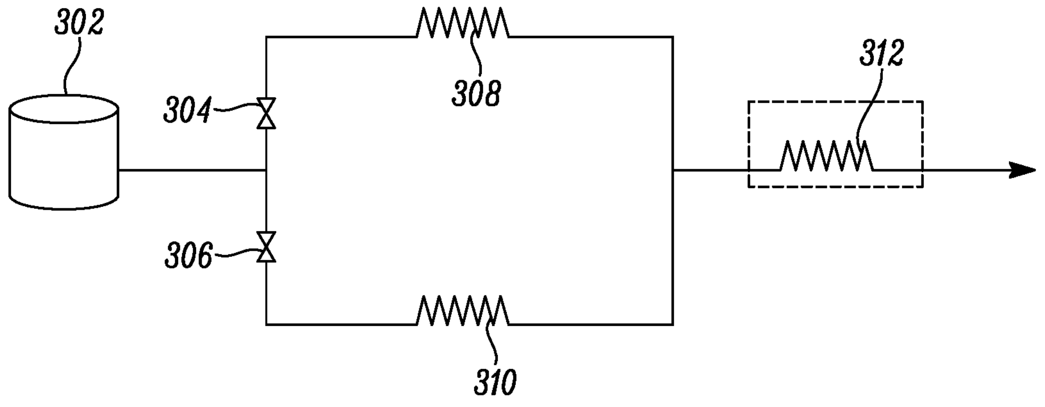
FIG. 3 is a diagram illustrating an AAV in a regasification system.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Figure 4:
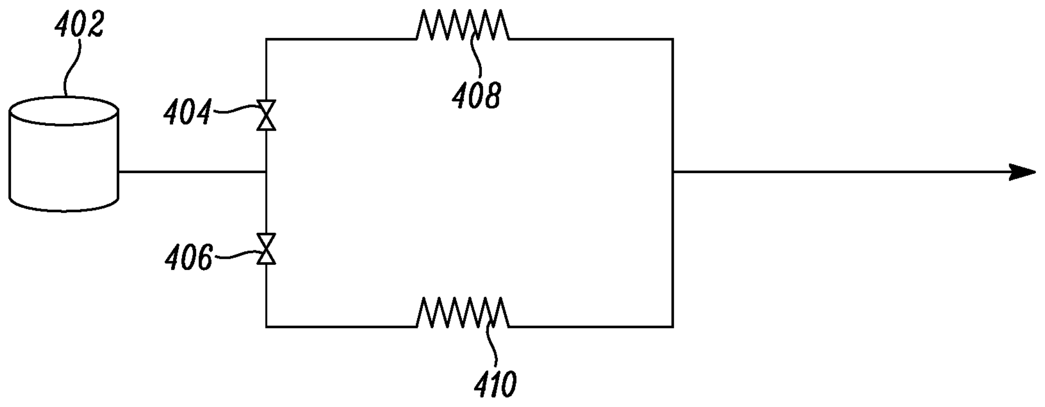
FIG. 4 is a diagram illustrating a vaporizer system configuration having parallel vaporizer arrangements, according to an embodiment of the disclosure.

FIG. 4 is a diagram illustrating a vaporizer system configuration having parallel vaporizer arrangements, according to an embodiment of the disclosure. A cryogenic storage tank 402 outputs liquid cryogen to a first heating medium 408 via a first control valve 404 on a first line and to a second heating medium 410 via a second control valve 406 on a second line. The first control valve 404 can be upstream or downstream of the first heating medium 408, and controls the flow of the liquid cryogen to the first heating medium 408. The second control valve 406 can be upstream or downstream of the second heating medium 410, and controls the flow of the liquid cryogen to the second heating medium 410. The two lines run in parallel and are rejoined after the first heating medium 408 and the second heating medium 410 to provide superheated vapor to an end user. The first heating medium 408 and the second heating medium 410 differ in type or configuration. For example the first heating medium 408 utilizes a different type of vaporization unit than the second heating medium 410, or the first heating medium 408 has a different configuration of vaporization units than that of the second heating medium 410.

Figure 5:
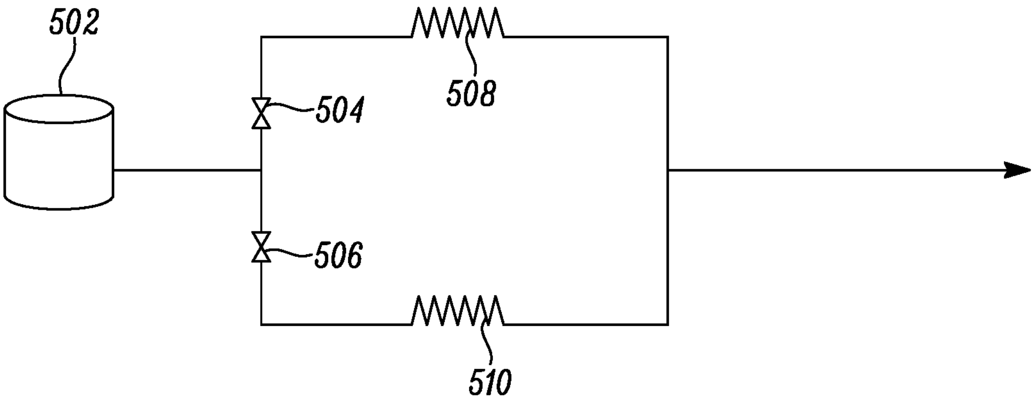
FIG. 5 is a diagram illustrating a vaporizer system configuration having a WBV and a heating medium, according to an embodiment of the disclosure.

Referring now to FIG. 5, a diagram illustrates a vaporizer system configuration having a WBV, according to an embodiment of the disclosure. A cryogenic storage tank 502 outputs liquid cryogen to a WBV 508 via a fail-close control valve 504 in a first line and to a heating medium 510 via a fail-open control valve 506 in a second line. The fail-close control valve 504 can be upstream or downstream of the WBV 508, and controls the flow of the liquid cryogen to the WBV 508. The fail-open control valve 506 can be upstream or downstream of the heating medium 510, and controls the flow of the liquid cryogen to the heating medium 510. The two lines run in parallel and are rejoined after the WBV 508 and the heating medium 510 to provide superheated vapor in a pipeline to an end user.

The fail-close control valve 504 and the WBV 508 of FIG. 5 correspond to the first control valve 404 and the first heating medium 408 of FIG. 4. The fail-open control valve 506 and the heating medium 510 of FIG. 5 correspond to the second control valve 406 and the second heating medium 410 of FIG. 4. The WBV 508 and the heating medium 510 are different types of heating mediums.

The WBV 508 is sized based on a normal operating condition having external heat available. Specifically, the tube bundle and the shell of the WBV 508 are not oversized due to the ballast time requirement. The heating medium 510 is sized to provide heat for supplying vaporized cryogen for a period of the ballast time. The heating medium 510 is passive or is equipment that does not require external power. For example, the heating medium 510 may be a loose fill media with a high heat capacity, such as, for example, rocks or a phase change material (PCM) having a high thermal mass, or a bank of AAV units in which ambient air exchanges heat to vaporize the liquid cryogen.

In normal operation, via a controller or processor, the fail-close control valve 504 is open while the fail-open control valve 506 is closed. The liquid cryogen is vaporized in the WBV 508. When the ability to generate external heat is lost at the WBV 508, the fail-close control valve 504 is automatically closed due to the fail-close feature, while the fail-open control valve 506 is automatically opened due to the fail-open feature. The liquid cryogen is then vaporized through the heating medium 510 and bypasses the WBV 508. The inability to generate external heat may be caused by, for example, the failure of a burner, the loss of natural gas, the loss of electric power, or the loss of steam.

In the embodiment of FIG. 5, the WBV 508 is only in operation when an energy source is available, and only needs to be sized based on normal operating conditions. During normal operation, ice will not bridge across the tubes and an excessive ice block will not form on the tube bundle of the WBV. Accordingly, more surface area can be used for heat exchange. Moreover, without ice blocking the flow field, natural convection is also enhanced. As a result, sizing an excessive amount of surface area is not required. Since the WBV 508 is only used when an energy source is available, water in the WBV 508 will not be used as a thermal ballast. Accordingly, a much smaller water volume, and hence shell size, is required for the same WBV capacity. For example, for the back-up system of a medium-sized air separation plant requiring a ballast time of 30 minutes, the WBV 508 is approximately 60% smaller when compared to traditional designs.

The passive heating medium 510 that is sized only for a duration of the ballast time is typically cost effective. For example, a thermal mass of approximately 6,500 gallons of limestone provides enough heat to supply vaporized cryogen for a ballast time of 30 minutes. Therefore, this embodiment overcomes challenges in fabrication, shipping, and field erection, and results in significant capital savings.

The embodiment of FIG. 5 also improves the back-up system in case of a loss of power. Conventionally, when restarting WBV operation after a loss of power-induced plant shut-down, the liquid cryogen may pass through an iced-up tube bundle where operational performance is compromised. However, in this embodiment, since the WBV 508 is not used during the ballast time, performance is assured after a loss of power that is induced by plant shut-down.

For an existing vaporizer system having a design that fails to meet a ballast time requirement, it is cost effective to upgrade the system based on this embodiment in order to meet the requirement.

Figure 6:
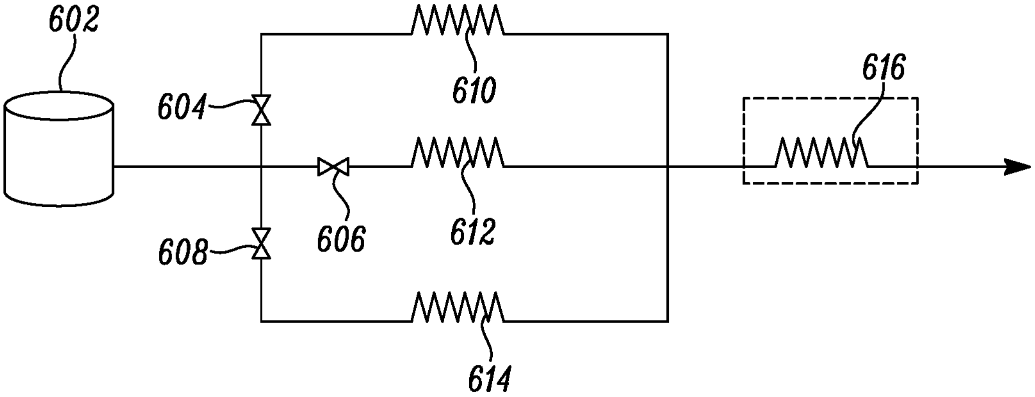
FIG. 6 is a diagram illustrating a vaporizer system configuration having multiple banks of AAVs, according to an embodiment of the disclosure.

Referring now to FIG. 6, a diagram illustrates a vaporizer system configuration having multiple banks of AAV units, according to an embodiment of the disclosure. A cryogenic storage tank 602 outputs liquid cryogen to a first bank of AAV units 610 via a first control valve 604 on a first line, to a second bank of AAV units 612 via a second control valve 606 on a second line, and to a third bank of AAV units 614 via a third control valve 608 on a third line. The first control valve 604 can be upstream or downstream of the first bank of AAV units 610, and controls the flow of the liquid cryogen to the first bank of AAV units 610. The second control valve 606 can be upstream or downstream of the second bank of AAV units 612, and controls the flow of the liquid cryogen to the second bank of AAV units 612. The third control valve 608 can be upstream or downstream of the third bank of AAV units 614, and controls the flow of the liquid cryogen to the third bank of AAV units 614. The three lines run in parallel and are rejoined after the banks of AAV units to provide superheated vapor to an end user. Operation is switched between the three banks of AAV units, 610, 612, and 614, for defrosting of idle banks, and the number of banks in parallel can be optimized for different geographic locations.

The first control valve 604 and the first bank of AAV units 610 of FIG. 6 correspond to the first control valve 404 and the first heating medium 408 of FIG. 4. The second and third control valves 606 and 608 and the second and third banks of AAV units 612 and 614 correspond to the second control valve 406 and the second heating medium 410 of FIG. 4. Thus, the single first bank of AAV units 610 (the first heating medium 408) is differently configured than the parallel second and third banks of AAV units 612 and 614 (the second heating medium 410). However, the individual banks of AAV units may have the same configuration. While this embodiment includes three banks of AAV units, additional parallel AAV units may also be included, although more than four banks of AAV units may not achieve the desired advantages.

Cryogen generally undergoes three state transitions within the finned tubes of an AAV unit. Specifically, the three states include subcooled liquid, boiling two-phase flow, and superheated gas. The formation of a large amount of frost mostly occurs along portions of the finned tubes having the subcooled liquid state and boiling two-phase flow state due to the large temperature difference between the cryogen and the ambient air. However, a large amount of frost generally does not form near the exit of the finned tubes in which the cryogen is in a superheated gas state. Thus, it may not be necessary to have redundant surface area, in a parallel arrangement, for superheating the gas above approximately 0° C., because almost no frost forms at that portion of the finned tubes.

Depending on geographic location, an additional bank of AAV units 616 may be provided downstream of the multiple banks of AAV units 610, 612, and 614, for superheating vaporized gas. For example, in a warm geographic location where the ambient temperature never falls below 0° C., this additional bank of AAV units 616 can be installed to superheat gas above 0° C. The AAV units in the multiple banks of AAV units 610, 612, and 614 are sized for a minimum discharge temperature of 0° C. Compared to a conventional design, approximately 10% less surface area is required for AAV units to achieve the same vaporization capacity with the same switching cycle time. In a cold geographic location where the ambient temperature can fall below 0° C., the additional bank of AAV units 616 is not provided and the AAV units in the multiple banks of AAV units 610, 612, and 614 are sized for a desired minimum temperature for discharge to the end user.

The operation of the multiple banks of AAV units 610, 612, and 614 is also designed based on the geographic location. In a warmer geographic location, an idle bank defrosts quickly, and an amount of time required for defrosting an idle bank of AAVs is generally less than the runtime of a duty bank of AAVs. For example, if the required defrosting time for an idle bank of AAVs is less than ½ but more than ⅓ of the runtime of the duty bank of AAVs, an optimized configuration is 3 banks of AAVs, in parallel, with two duty banks of AAVs and one idle bank of AAVs in each switching cycle. A controller or processor controls the control valves 604, 606, and 608 to perform the switching cycle.

In designing the system for operation in the warmer geographic location, compared to the conventional configuration, about 25% less surface area is required for the AAV units to achieve the same vaporization capacity with the same switching cycle time, and as high as 45% less surface area is required for the AAV units to achieve the same vaporization capacity with a shorter switching cycle time.

In a cooler geographic location, an idle bank of AAVs defrosts slowly, and thus, an amount of time required for defrosting an idle bank of AAVs is generally more than the runtime of a duty bank of AAVs. For example, if the required defrosting time for an idle bank of AAVs is more than the runtime, but less than twice the runtime, an optimized configuration is 3 banks of AAVs, in parallel, with one duty bank of AAVs and two idle banks of AAVs for each switching cycle. A controller or processor controls the control valves 604, 606, and 608 to perform the switching cycle.

In designing the system for operation in the cooler geographic location, compared to the conventional configuration, about 50% more surface area is required for the AAV units to achieve the same vaporization capacity with the same switching cycle time. However, with a shorter switching cycle time, an increase in the surface area of AAV units can be optimized to be as low as about 15%.

According to embodiments, a configuration of an optimized system is proposed that shows the benefit depending on ambient conditions and geographic locations where the AAV units are installed.

Figure 7:
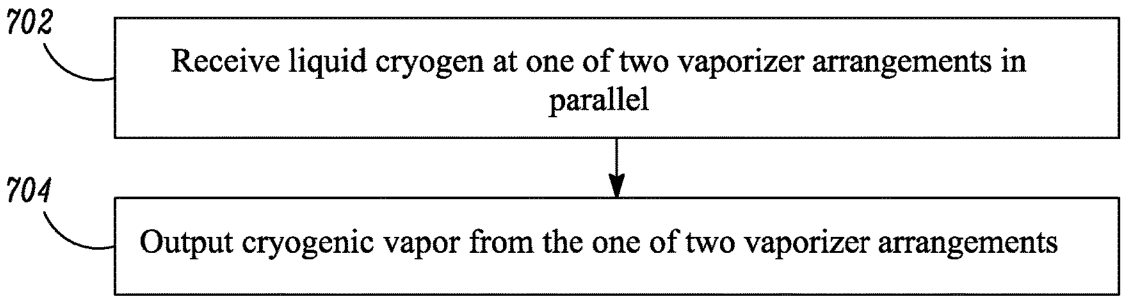
FIG. 7 is a flowchart illustrating a method for the regasification of cryogen, according to an embodiment.

Referring now to FIG. 7, a flowchart illustrates a method for cryogenic vaporization, according to an embodiment of the disclosure. At 702, liquid cryogen is received, via at least one control valve, at one of a first vaporizer arrangement and a second vaporizer arrangement, which are connected in parallel. The second vaporizer arrangement includes one or more banks of AAVs, or loose fill media with a high heat capacity, such as, for example, rocks or a PCM, and has a different configuration than that of the first vaporizer arrangement. At 704, superheated vapor is output from the one of the first vaporizer arrangement and the second vaporizer arrangement.

Figure 8:
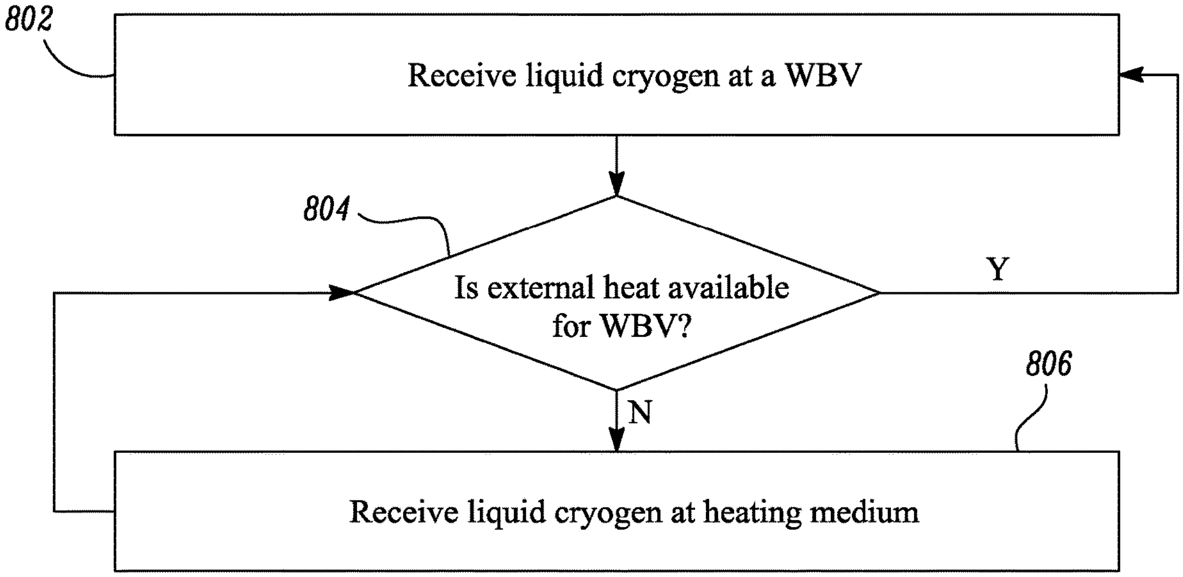
FIG. 8 is a flowchart illustrating a method for receiving liquid cryogen at a WBV, according to an embodiment.

Referring now to FIG. 8, a flowchart illustrates a method for receiving liquid cryogen, according to an embodiment of the disclosure. The methodology of FIG. 8 is a detailed description of 702 of FIG. 7, where the first vaporizer arrangement includes a WBV and the second vaporizer arrangement includes a bank of AAVs or loose fill media with a high heat capacity, such as, for example, rocks or a PCM.

At 802, liquid cryogen is received at the WBV via a fail-close control valve. At 804, a controller or processor of the system determines whether external heat remains available for the WBV. External heat may fail due to, for example, the failure of a burner, the loss of natural gas, the loss of electric power, or the loss of steam. When external heat remains available for the WBV, the methodology returns to 802, and the liquid cryogen continues to be received at the WBV. When external heat is no longer available for the WBV, the liquid cryogen is received at a second heating medium connected in parallel with the WBV, at 806. The second heating medium may be, for example, a bank of AAVs or loose fill media with a high heat capacity, such as, for example, rocks or a PCM. The liquid cryogen is provided to the second heating medium by closing the fail-close control valve on the line with the WBV, and opening the fail-open control valve on the line with the heating medium. The methodology then returns to 804, where it is again determined whether external heat is available for the WBV.

Figure 9:
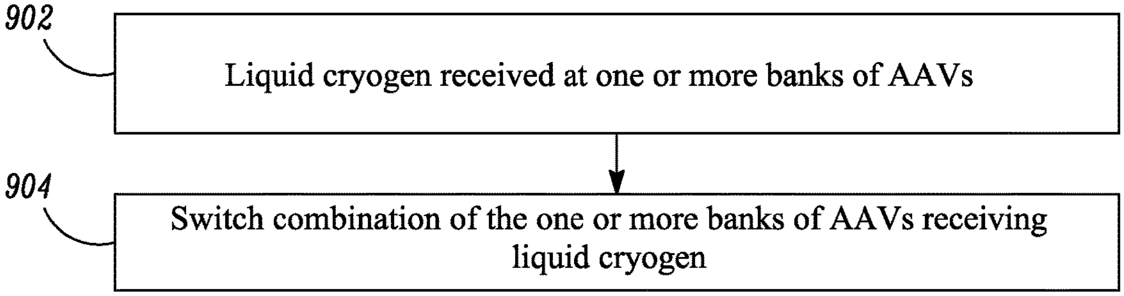
FIG. 9 is a flowchart illustrating a method for receiving liquid cryogen at an AAV, according to an embodiment.

Referring now to FIG. 9, a flowchart illustrates a method for receiving liquid cryogen, according to another embodiment of the disclosure. The methodology of FIG. 9 is a detailed description of 702 of FIG. 7, where the first vaporizer arrangement includes a first bank of AAVs, and the second vaporizer arrangement includes a second bank of AAVs and a third bank of AAVs, configured in parallel.

At 902, liquid cryogen is received at one or more of the banks of AAVs. Each of the banks of AAVs are connected in parallel, and at least one bank of AAVs of the banks of AAVs is idle and does not receive the liquid cryogen. At 904, a controller or processor of the system switches the combination of banks of AAVs that receive the liquid cryogen based on a preset switching cycle time or a discharge temperature of the superheated vapor. For example, with three banks of AAVs in parallel, two banks of AAVs may receive the liquid cryogen, while a third bank of AAVs remains idle in order to defrost. The controller or processor then switches the idle bank of AAVs. In another example, with three banks of AAVs in parallel, a single bank of AAVs receives the liquid cryogen, while the remaining two banks of AAVs remain idle to defrost. The controller or processor then switches the single bank of AAVs that receives the liquid cryogen.

Figure 10:
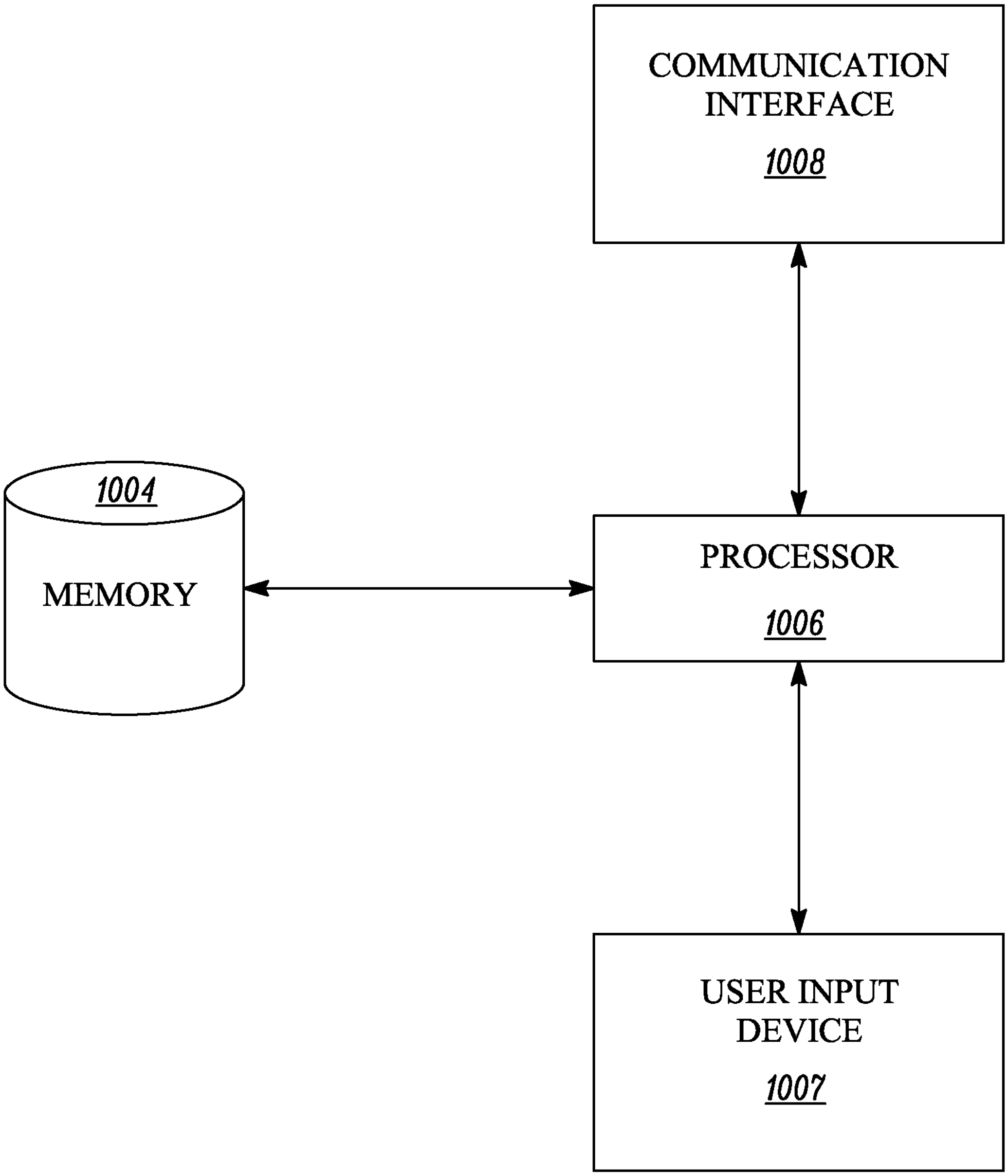
FIG. 10 is a block diagram illustrating a controller for controlling a vaporizer system, according to an embodiment.

FIG. 10 is a block diagram illustrating a controller for controlling a vaporizer system, according to an embodiment. The controller may be embodied as a programmable logic controller (PLC). The controller may include at least one user input device 1007 and a memory 1004 for storing at least a switching schedule between parallel paths of heating mediums in the vaporizer system. The apparatus also includes a processor 1006 for determining when to switch between the parallel paths of heating mediums. For example, the processor 1006 may determine whether external heat is available for a WBV, how to switch between multiple banks of AAV units, and controlling control valves to enable the switching. Additionally, the apparatus may include a communication interface 1008.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A cryogenic vaporization system, the system comprising:

a first bank of ambient air vaporizer units configured for vaporizing a liquid cryogen and outputting a stream of cryogenic vapor;

a second bank of ambient air vaporizer units configured for vaporizing the liquid cryogen and outputting another stream of cryogenic vapor, the second bank of ambient air vaporizer units connected in parallel with the first bank of ambient air vaporizer units;

a third bank of ambient air vaporizer units configured for receiving the liquid cryogen and outputting yet another stream of cryogenic vapor, the third bank of ambient air vaporizer units connected in parallel with the first bank of ambient air vaporizer units and the second bank of ambient air vaporizer units; and a plurality of control valves configured to switch provision of the liquid cryogen between the first, second, and third banks of ambient air vaporizer units such that two of the first, second, and third banks of ambient air vaporizer units vaporize the liquid cryogen, while one of the first, second, and third banks of ambient air vaporizer units is idle.

2. The cryogenic vaporization system of claim 1, wherein the plurality of control valves comprise a first control valve in a first line with the first bank of ambient air vaporizer units, a second control valve in a second line with the second bank of ambient air vaporizer units, and a third control valve in a third line with the third bank of ambient air vaporizer units.

3. The cryogenic vaporization system of claim 1, further comprising a downstream vaporizer comprising a water bath vaporizer or a fourth bank of ambient air vaporizer units disposed downstream and in series with the first, second, and third banks of ambient air vaporizer units.

4. A method for controlling a cryogenic vaporization system, the method comprising the steps of:

receiving, via a plurality of control valves, a liquid cryogen at banks of ambient air vaporizers selected from a first bank of ambient air vaporizer units, a second bank of ambient air vaporizer units, and a third bank of ambient air vaporizer units connected in parallel arrangement; and vaporizing the liquid cryogen in two of the first bank of ambient air vaporizer units, the second bank of ambient air vaporizer units, and/or the third bank of ambient air vaporizer units to create one or two streams of cryogenic vapor while concurrently defrosting one of the first bank of ambient air vaporizer units, the second bank of ambient air vaporizer units, and/or the third bank of ambient air vaporizer units;

combining the one or two streams of cryogenic vapor;

heating the combined streams of cryogenic vapor in a downstream vaporizer comprising a water bath vaporizer or a fourth bank of ambient air vaporizer units disposed downstream and in series with the first, second, and third banks of ambient air vaporizer units; and outputting a superheated vapor from the downstream vaporizer.

5. The method of claim 4, wherein the plurality of control valves comprise a first control valve in a first line with the first bank of ambient air vaporizer units, a second control valve in a second line with the second bank of ambient air vaporizer units, and a third control valve in a third line with the third bank of ambient air vaporizer units.

* * * * *